United States Patent [19]
Otsuki et al.

[11] 3,717,553
[45] Feb. 20, 1973

[54] PROCESS AND APPARATUS FOR THE DISTILLATION OF A VINYL MONOMER

[75] Inventors: Susumu Otsuki; Kyoichi Hori; Isao Miyanohara, all of Yamaguchi, Japan

[73] Assignee: Rohm and Haas Company, Philadelphia, Pa.

[22] Filed: June 8, 1970

[21] Appl. No.: 44,457

[30] Foreign Application Priority Data

June 6, 1969 Japan .................................. 44/44470

[52] U.S. Cl. ............................... 202/158, 261/114
[51] Int. Cl. .................................................. B01d 3/22
[58] Field of Search ............... 202/158; 261/113, 114; 203/DIG. 3, 8, 9, 7; 196/14.52

[56] References Cited

UNITED STATES PATENTS

| | | |
|---|---|---|
| 3,340,160 | 9/1967 | Waldby ............................ 203/9 |
| 3,530,043 | 9/1970 | Horn et al. ....................... 203/8 X |
| 3,196,085 | 7/1965 | Dippel .............................. 203/8 |
| 3,445,347 | 5/1969 | Borrel et al. .................. 203/DIG. 3 |
| 2,767,967 | 10/1956 | Hutchinson .................. 202/158 X |
| 2,973,189 | 2/1961 | Ju Chin Chu .................... 261/114 |
| 2,682,394 | 6/1954 | Guthrie et al. ............... 202/158 X |
| 2,767,966 | 10/1956 | Chave ........................... 202/158 X |
| 3,050,447 | 8/1962 | Olney ........................... 202/158 X |
| 3,095,462 | 6/1963 | Pomper ........................... 261/113 |
| 2,900,421 | 8/1959 | Kharasch et al. ............... 203/9 X |

*Primary Examiner*—Norman Yudkoff
*Assistant Examiner*—David Edwards
*Attorney*—Sughrue, Rothwell, Mion, Zinn and Macpeak

[57] ABSTRACT

The distillation of vinyl monomers is carried out stably with inhibition of polymerization using a distillation tower having perforated trays devoid of downcomers, the trays being perforated with holes near the tower wall to cause a substantial wetting of the back surfaces of the trays and the tower wall with the liquid flowing down through the holes.

5 Claims, 8 Drawing Figures

INVENTORS
SUSUMU OTSUKI
KYOICHI HORI
ISAO MIYANOHARA

ATTORNEYS

PROCESS AND APPARATUS FOR THE DISTILLATION OF A VINYL MONOMER

BACKGROUND OF THE INVENTION

1. Field of the Invention

This invention relates to a process for distilling a system containing a vinyl monomer and more particularly to a distillation tower for such a distillation.

2. Description of the Prior Art

The term vinyl monomer, as used herein, is intended to include such compounds as acrylic acid, methacrylic acid, acrylates, acrylonitrile, vinyl acetate, styrene, chloroprene, and butadiene; all of which are susceptible to polymerization during their concentration or purification. Various distillation procedures are employed in concentrating or purifying such vinyl monomers. It is well known that vinyl monomers are easily polymerized by heat, but since the distillation must be carried out by heating, more or less, various measures are required to prevent the polymerization of the vinyl monomers during distillation.

The use of a polymerization inhibitor is known as one of these measures. However, when a known polymerization inhibitor as hydroquinone, phenothiazine, pyrocatechol, methylene blue, or sulfur is used in the distillation of a vinyl monomer, the polymerization of the vinyl monomer occurs far more easily in a gaseous phase than in a liquid phase. The polymerization in the gaseous phase takes place mainly at the tower wall, the back surfaces of the trays, and the exterior portions of the overflow pipes (downcomers). The rate of growth of the polymer is so rapid that the tower is clogged in a short period of time to render the distillation tower inoperative. Thus, it may be said that the stability of the distillation is dependent upon the inhibition of polymerization at the above-mentioned parts.

As is known, the polymerization occurring at this time is chiefly a radical polymerization, and phenolic compounds, amine compounds, nitro compounds, phosphorous compounds, sulfur compounds, or heavy metal salts are used as polymerization inhibitors, those having a conjugated double bond in their molecule being especially effective. Most of them are high boiling substances, and the desirability of using nonvolatile inhibitors is also based on the problem of mixing of such inhibitors in the final distillation product. In the distillation operation, the concentration of the polymerization inhibitor in an evaporated monomer is very low, and when the vapor is partially condensed at the tower wall, the back surfaces of trays or the exterior portions of downcomers, the concentration of the inhibitor is far lower than that of the inhibitor present in the liquid maintained on the tray, resulting in a ready occurrence of polymerization of monomer at these parts (see the Reference Examples appearing below in the specification).

It has now been found that the polymerization of vinyl monomers during distillation can be remarkably prevented by using a distillation tower wherein downcomers are removed and perforated trays of specific construction are fitted to ensure a perpetual wetting of the back surfaces of the trays and the tower wall with a liquid containing a polymerization inhibitor.

SUMMARY OF THE INVENTION

The present invention provides a process for distilling a vinyl monomer wherein the distillation is carried out using a distillation tower having perforated trays with no downcomers, the trays being perforated with holes of slits near the tower wall to cause a substantial wetting of the entire wall surface of the tower and the back surfaces of the trays with a liquid flowing down through the holes and/or slits. The present invention also provides a distillation tower including perforated trays devoid of downcomers, the trays being perforated with holes or slits near the tower wall to cause a substantial wetting of the entire wall surface of the tower and the back surfaces of the trays with a liquid flowing down through the holes or slits.

BRIEF DESCRIPTION OF THE DRAWINGS

The interior structure of the distillation tower according to the present invention will be described with reference to the accompanying drawings in which:

FIG. 1-E is a plan view of a conventional tray;

DETAILED DESCRIPTION OF THE PREFERRED EMBODIMENTS

Figure 1:
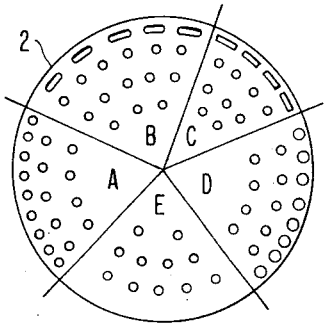
FIGS. 1-A, 1-B, 1-C and 1-D are plan views illustrating different embodiments of the trays used in the practice of the present invention.
Figure 4:
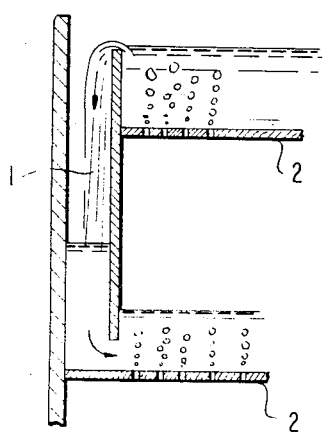
FIG. 4 is a side elevation in vertical section showing one embodiment of a gas-liquid contacting part of a conventional sieve plate tower.

With an ordinary sieve plate tower having downcomers as illustrated in FIG. 4, the liquid flows down substantially through downcomer 1. A sieve plate tower without downcomers is known, but perforations are usually provided apart from the tower walls, within an area of about 85 percent around the center of a cross-sectional area of the tower as shown in FIG. 1-E. In other words, as is seen from FIG. 1-E, the holes are not present near the tower walls.

Figure 2:
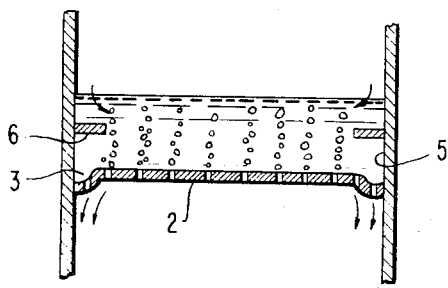
FIG. 2 is a side elevation in vertical section showing one embodiment of a gas-liquid contacting part of a distillation tower used in the present invention.
Figure 3:
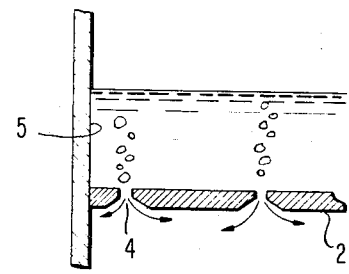
FIG. 3 is a side elevation in vertical section showing another embodiment of tray perforations according to the present invention.

A perforated tray 2 used in the present invention is of the same type as those generally used except for its periphery. About the periphery of the tray, namely near the tower wall, are provided perforations of various shapes for facilitating the passage of the downflow liquid and in order to obtain a good dispersion, as illustrated in FIGS. 1-A, 1-B, 1-C and 1-D. A valley portion 3 may be provided in the periphery of the tray, as shown in FIG. 2, to facilitate the downflow of liquid and enable the passing liquid to come down along the tower wall. In another embodiment, the tray may be perforated with cone-shaped holes 4, as illustrated in FIG. 3, to enable the downflow liquid to flow along the back surface of the tray and the tower wall. A combination of these types may also be used.

Although not essential to the present invention, a doughnut-shaped baffle plate 6 can be fitted above the tray to ensure a better mixing of the liquid flowing down along the tower wall with the liquid maintained on the tray.

REFERENCE EXAMPLE 1

Several test tubes were charged with 10 g of pure acrylic acid and a polymerization inhibitor of the types and concentrations indicated in Table 1, and immersed in an oil bath maintained at 105° C. The time during which the polymerization was inhibited was measured. The results are shown in Table 1.

TABLE 1

| Polymerization inhibitor | Concentration of the inhibitor (% by weight) | Inhibition time (hours) |
| --- | --- | --- |
| None | | 1 |
| Hydroquinone | 0.03 | more than 30 |
| Phenothiazine | 0.03 | more than 30 |
| Methylene blue | 0.03 | more than 30 |
| Pyrocatechol | 0.03 | more than 30 |
| Semicarbazide hydrochloride | 0.03 | more than 30 |
| Sulfur | 0.06 | 11 |

REFERENCE EXAMPLE 2

Flasks equipped with a total reflux condenser were charged with 100 g of pure acrylic acid and a polymerization inhibitor of the types and concentrations indicated in Table 2, and immersed in an oil bath maintained at 105° C. A boiling test was performed at a pressure of 170 mmHg. The results are shown in Table 2 as average values of several repeated tests.

TABLE 2

| Polymerization inhibitor | Concentration of the inhibitor (% by weight) | Inhibition time (hours) |
| --- | --- | --- |
| None | | 0.5 |
| Hydroquinone | 0.3 | 0.7 |
| Phenothiazine | 0.3 | 1.5 |
| Methylene blue | 0.3 | 0.4 |
| Pyrocatechol | 0.3 | 0.4 |
| Semicarbazide hydrochloride | 0.3 | 0.4 |
| Sulfur | 0.3 | 0.6 |

In Reference Example 2, polymerization occurred in the gaseous phase in all runs. Comparison of the results with those obtained in Reference Example 1 indicates that polymerization takes place in a very short period of time in the runs conducted in Reference Example 2 in spite of the higher inhibitor concentrations. Not only acrylic acid, but also almost all vinyl compounds have this tendency.

The present invention will be described further by reference to the following Examples, which are intended to be illustrative rather than limitative.

EXAMPLE 1

Total reflux distillation of pure acrylic acid was performed using an ordinary sieve plate tower including three 83 mm diameter trays perforated with holes of the type shown in FIG. 1-E and having downcomers illustrated in FIG. 4, and a distillation tower with perforated trays of the type shown in FIG. 1-A having the interior structure illustrated in FIG. 2, respectively. The operating pressure was 160–170 mmHg, and the temperature in the tower was maintained at 95° to 100° C. A solution of 1 percent hydroquinone in acrylic acid was added to the top of the tower, and the concentration of hydroquinone in the liquid within the tower was maintained at 0.05 percent by weight in each run. Oxygen was introduced from the still portion of the tower, and its concentration was adjusted to 1 percent by volume based on the acrylic acid vapor.

It was found that with the ordinary sieve plate tower having downcomers as shown in FIG. 4, a polymer occurred in 2 hours, whereas with the tower having the interior structure shown in FIG. 2, it was formed only after a lapse of 16 hours.

EXAMPLE 2

Total reflux distillation of pure acrylic acid was performed using an ordinary sieve plate tower having downcomers as illustrated in FIG. 4 and including three 50 mm diameter trays perforated with holes of the type shown in FIG. 1-E, and a distillation tower with perforated trays of the type shown in FIG. 1-D and having the interior structure illustrated in FIG. 3. The operating pressure was 160 to 170 mmHg, and the temperature in the tower was maintained at 95° to 100° C. A solution of 1 percent hydroquinone in acrylic acid was added to the top of the tower and the concentration of hydroquinone in the liquid within the tower was maintained at 0.05 percent by weight in each run. Oxygen was introduced from the still portion of the tower, and its concentration was adjusted to 1 percent by volume based on the acrylic acid vapor.

It was found that with the ordinary sieve plate tower having downcomers as shown in FIG. 4, a polymer occurred in 2 hours, whereas with the tower having the interior structure illustrated in FIG. 3, it was formed only after a lapse of 14 hours.

What is claimed is:

1. A distillation tower for use in the distillation of a vinyl monomer, comprising a tower having perforated trays devoid of downcomers, said trays being perforated in the vicinity of the tower wall with apertures which are larger than other apertures in said trays, wherein the liquid flowing down through said tower causes a substantial wetting of the back surfaces of said trays and substantially the entire wall surface of the tower.

2. The distillation tower according to claim 1, wherein said apertures are cone-shaped holes diverging downwardly.

3. The distillation tower according to claim 1, wherein each of said trays has a valley portion in its periphery adjacent said tower wall.

4. The distillation tower of claim 1, wherein baffle plates are disposed above each of said trays to ensure the mixing of the downflowing liquid with the liquid on each of said trays.

5. A distillation tower for use in the distillation of a vinyl monomer consisting essentially of a tower having a plurality of perforated trays therein, said trays having perforations near the tower wall which are larger in size than the perforations in the other portions of said trays and being devoid of downcomers, said apertures being cone-shaped holes diverging downwardly, each of said trays having a valley portion in its periphery adjacent the interior tower wall surface, wherein the liquid flowing downwardly through said tower causes a substantial wetting of the back surfaces of said trays and substantially wets the entire interior wall surface of said tower.

* * * * *